W. A. Ives,
Auger Handle.
No. 108,267.        Patented Oct. 11, 1870.

Witnesses:
A. J. Tibbits
S. H. Shumway

William A. Ives
Inventor
By his Attorney
John E. Earle

United States Patent Office.

WILLIAM A. IVES, OF NEW HAVEN, CONNECTICUT.

Letters Patent No. 108,267, dated October 11, 1870.

IMPROVEMENT IN AUGER-HANDLES.

The Schedule referred to in these Letters Patent and making part of the same.

*To all whom it may concern:*

Be it known that I, WILLIAM A. IVES, of New Haven, in the county of New Haven and State of Connecticut, have invented a new improvement in Auger-Handles; and I do hereby declare the following, when taken in connection with the accompanying drawing and the letters of reference marked thereon, to be a full, clear, and exact description of the same, and which said drawing constitutes part of this specification, and represents in—

Figure 1:
Figure 2:
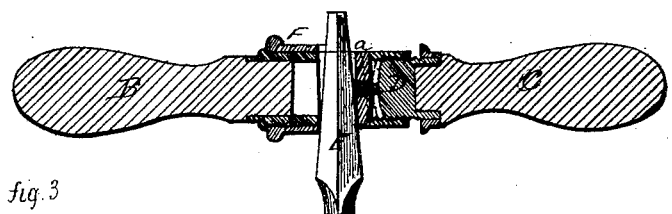
Figure 3:

Figure 1 a top view;
Figure 2, a longitudinal central section;
Figure 3, the cam detached; and in
Figure 4, a modification of the jaw.

This invention relates to an improvement in auger-handles, such as are constructed to receive and hold different augers; and It consists—

First, in a cylindrical cam, arranged upon the socket, so as to adjust the position of the auger, combined with a screw upon the opposite side to secure the auger into position.

Second, in combination with the above, a self-adjusting jaw to aid in securing the auger.

A is a socket, into one end of which a handle, D, is fixed, the other end threaded, so as to receive the correspondingly-threaded end D of the other handle C; through the socket an opening is made for the insertion of the shank E of the auger, as seen in fig. 2.

Around the socket, upon the end of the fixed handle, a cylindrical cam, F, is arranged, as seen in figs. 1 and 2, the said cam turning freely around the socket. By this cam the position of the auger is governed, as by turning the cam the inclined edge will, at some point, bear upon both the upper and lower sides, as seen in fig. 2, to accommodate the taper of the shank. When the shank of the auger is thus adjusted, the head D is turned up, so as to bear against and hold the auger within the grasp of the handle. This is best done by arranging a jaw, *a*, as seen in figs. 1 and 2, attached to the end D, so as to swing vertically, and to accommodate itself to the inclination or taper of the shank, as denoted in broken lines, fig. 2.

Figure 4:

In some cases, it may be desirable that the jaw be constructed so as to grasp the auger below the tapered shank, as seen in fig. 4. In such case, the lower end of the jaw extends, as at *d*, fig. 4, so as to grasp below the head or taper of the auger; and a corresponding jaw may be arranged upon the opposite side, against which the cam would bear in like manner, as described, for bearing against the shank of the auger.

I do not wish to be understood as broadly claiming an auger-handle constructed so as to be adjusted to receive and hold different augers; but I do claim—

1. In combination with the socket A, a fixed handle, B, and adjusting-screw D, the cylindrical cam F, operating in the manner and for the purpose substantially as described.

2. In combination with the subject-matter of the first clause, the self-adjusting jaw *a*, when made so as to be self-adjusting against the shank of the auger, and whether made to grasp below the shank or not, substantially in the manner as herein set forth.

W. A. IVES.

Witnesses:
A. J. TIBBITS,
J. H. SHUMWAY.